United States Patent [19]

Oikawa

[11] Patent Number: 5,635,930
[45] Date of Patent: Jun. 3, 1997

[54] INFORMATION ENCODING METHOD AND APPARATUS, INFORMATION DECODING METHOD AND APPARATUS AND RECORDING MEDIUM

[75] Inventor: Yoshiaki Oikawa, Kanagawa, Japan

[73] Assignee: Sony Corporation, Japan

[21] Appl. No.: 534,890

[22] Filed: Sep. 27, 1995

[30] Foreign Application Priority Data

Oct. 3, 1994 [JP] Japan .................................. 6-239197

[51] Int. Cl.⁶ .................................................. H03M 5/00
[52] U.S. Cl. .................................................. 341/50; 369/49
[58] Field of Search .................................. 341/50, 51, 81; 369/49; 371/68.1; 379/73

[56] References Cited

U.S. PATENT DOCUMENTS 3,989,903  11/1976  Cooper et al. ..................... 179/100.4

FOREIGN PATENT DOCUMENTS

0369682A2  5/1990  European Pat. Off. .
0665547A2  2/1995  European Pat. Off. .

*Primary Examiner*—Brian K. Young
*Attorney, Agent, or Firm*—Ronald P. Kananen

[57] ABSTRACT

An information encoding and decoding apparatus and an information encoding and decoding method for effectively diminishing the mixing noise by pre-mixing and dematrixing. When encoding multi-channel audio or speech signals inclusive of signals of the mixed channels, whereby the audio or speech signals become reproducible even with a simplified decoder, the noise generated on dematrixing the signals of the mixed channels are included in the codestring signals as the difference signals between the pre-mixing signals of the non-independent channels and the signals of the non-independent channels as found by dematrixing signals of mixed channels. Thus the number of bits may be prevented from being increased despite increase in the number of channels.

11 Claims, 11 Drawing Sheets

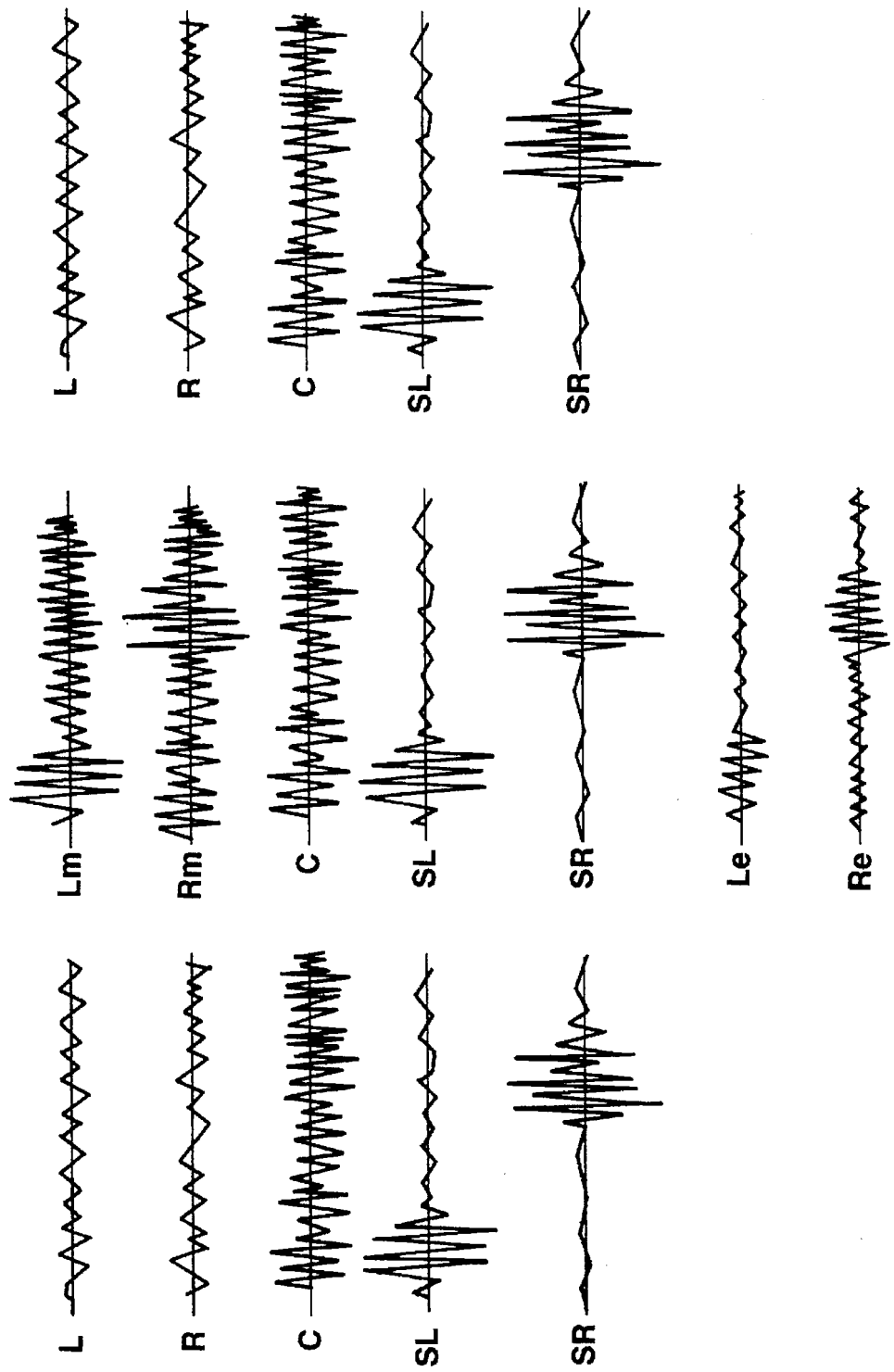

INFORMATION ENCODING METHOD AND APPARATUS, INFORMATION DECODING METHOD AND APPARATUS AND RECORDING MEDIUM

BACKGROUND OF THE INVENTION

This invention relates to an information encoding method and apparatus and an information decoding method and apparatus for encoding and decoding signals of plural channels employed in a multi-channel sound acoustic system, such as a motion picture film projection system, a video tape recorder or a video disc player. The invention also relates to a recording medium on are recorded information signals formed by the information encoding method and apparatus.

In a motion picture film on which are recorded audio or speech signals of plural channels, there are occasions wherein digital audio signals of five channels, namely a left channel (L), a center channel (C), a right channel (R), a surround left channel (SL) and a surround right channel (SR), are handled.

Since a recording medium or a transmission route of a large capacity is required if the signals of the respective channels are directly recorded on a recording medium or transmitted on a communication route, these signals are customarily encoded by high-efficiency encoding for recording or transmission.

There exist a variety of systems for high efficiency encoding of audio or speech signals. Among these systems, there is known a so-called transform coding in which time-domain audio signals are divided into unit time blocks, the block-based time-domain signals are converted by orthogonal transform into frequency domain signals, which are then divided into plural frequency bands for encoding from one band to another.

There is also known a sub-band coding or a non-blocking frequency band splitting system in which time-domain audio signals are divided into plural frequency bands for encoding without dividing the time-domain audio signals into unit time blocks.

In another high-efficiency encoding system consisting in combination of the sub-band coding and transform coding, the time-domain signals are divided into plural frequency bands and the signals of the respective bands are converted by orthogonal transform into frequency-domain signals which then are encoded from one band to another.

The apparatus for encoding the plural signals with the aid of the above-described encoding systems for recording or transmission or the apparatus for decoding these encoded signals for reproduction or reception is usually in need of a number of encoding and decoding circuits equal to the number of the channels. In the case of the above-mentioned motion picture film, encoding and decoding circuits for five channels are required.

FIG. 1 shows a construction of an encoding apparatus (encoder) for independently encoding digital audio signals of the above-mentioned five channels L, SL, C, SR and R from channel to channel.

Referring to FIG. 1, digital audio signals of the left channel (L) and digital audio signals of the surround left channel (SL) enter an input terminal $51_1$ and an input terminal $51_2$, respectively. In a similar manner, signals of the center channel (C), surround right channel (SR) and the right channel (R) enter input terminals $51_3$, $51_4$ and $51_5$, respectively.

The digital audio signals of these plural channels are sent via the input terminals $51_1$ to $51_5$, associated with the respective channels, to encoding circuits $52_1$ to $52_5$, similarly associated with the respective channels, respectively. The signals encoded by these encoding circuits $52_1$ to $52_5$ are sent to a codestring generating circuit 53.

The codestring generating circuit 83 assembles the encoded signals of the plural channels into a codestring, in accordance with a pre-set format, fop transmission or recording on the recording medium.

FIG. 2 shows the construction of a decoding apparatus (decoder) for decoding the recorded or transmitted encoded signals of the plural channels.

Referring to FIG. 2, the encoded signals of the codestring, reproduced from a recording medium or transmitted over a transmission path, are supplied via an input terminal 61 to a codestring separating circuit 82. The codestring separating circuit 62 separates the supplied codestring signals into encoded signals of the respective channels in accordance with a pre-set format. The encoded signals of the respective channel are sent to decoding circuits $63_1$ to $63_5$ provided for the respective channels. The encoded left-channel signals are decoded by a decoding circuit $63_1$, while the encoded surround-left channel signals are decoded by a decoding circuit $63_2$. In a similar manner, the encoded center channel, surround right channel and the right channel signals are decoded by the decoding circuits $63_3$, $63_4$ and $63_5$, respectively. The digital audio signals of the respective channels L, SL, C, SR and R, decoded by these decoding circuits $63_1$ to $63_5$, are outputted via associated output terminals $64_1$ to $64_5$. For decoding and reproducing codestring signals, obtained on encoding signals of respective channels, the number of the reproducing apparatus, such as speakers and amplifiers, equal to the number of the channels, are required. In the above example, the reproducing components of five channels are required.

If a reproducing apparatus of a simplified structure is employed, there ape occasions wherein it is required to reproduce the signals over the number of channels smaller than the number of the original channels, for example, over two channels. In such case, it is necessary to mix the playback signal of the respective channels, decoded by the 5-channel decoder described above, into two channels. This may be realized by addition as shown by the equations (1) and (2):

$$Lm=L+a*C+b,SL \quad (1)$$

$$Rm=R+a*C+b*SR \quad (2)$$

where Lm, Rm, L, R, C, SL and SR denote a mixed left channel, a mixed right channel, a left channel, a right channel, a center channel, a surround left channel and a surround right channel, respectively. Also, a and b denote mixing coefficients.

In such case, while it is sufficient to reproduce only two channels, decoding circuits for five channels are required as a decoder. Since the scale of the decoder is not changed from the above-mentioned decoder for the five channels, such decoder cannot be realized easily.

For easily reproducing two-channel signals, it may be contemplated to transmit signals obtained on pre-mixing signals of channels other than the inherent channels on the two channels for transmitted signals and to decode only the signals of these two channels by the decoder. The method of pre-mixing signals of pre-set channels is termed a pre-mix method.

For example, the encoder forms signals of respective channels by the equations (3) to (7):

$$Lm = L + a*C + b*SL \quad (3)$$

$$Rm = R + a*C + b*SR \quad (4)$$

$$C \quad (5)$$

$$SL \quad (6)$$

$$SR \quad (7)$$

Thus it is sufficient for the decoder to have a decoding circuit for two channels, that is a mixed left channel (Lm) and a mixed right channel (Rm), so that the decoder can be realized easily.

On the other hand, for reproducing signals of e.g., the left channel (L) and the right channel (R), signals of the channels not transmitted independently need to be produced by subtracting these signals from signals of the mixed channels, that is the mixed left channel and the mixed right channels. That is, signals transmitted independently are subtracted from the signals of the mixed channels. This operation is termed a dematrixing operation.

For example, for producing signals of the left channel (L) and the right channels (R) from the signals of the equations (3) to (7), it is necessary to perform the operations of the equations (8) and (9):

$$L = Lm - a*C - b*SL \quad (8)$$

$$R = Rm - a*C - b*SR \quad (9)$$

FIG. 3 shows a construction of an encoder for encoding the pre-mixed channel signals. In FIG. 3, the components having the similar function to that of FIG. 1 are depicted by the same reference numerals.

Referring to FIG. 3, an addition circuit $72_1$ is arranged upstream of the encoding circuit $52_1$ provided in FIG. 1 for a left channel. The addition circuit $72_1$ is fed with left-channel signals entering the input terminal $51_1$, a signal obtained by multiplying the surround left channel signal entering the input terminal $51_2$ by the coefficient b by a multiplication circuit $71_2$ and a signal obtained by multiplying the center channel signal entering the input terminal $51_3$ by the coefficient a. These signals are mixed by the addition circuit $72_1$ to form signals of the mixed left channel Lm. These mixed left channel Lm are fed to the encoding circuit $52_1$ to form encoded signals which are sent to a codestring generating circuit On the other hand, an addition circuit $72_2$ is arranged upstream of an encoding circuit $52_5$ provided in FIG. 1 for a right channel. The addition circuit $72_1$ is fed with right-channel signals entering the input terminal $51_5$, a signal obtained by multiplying the surround right channel signal entering the input terminal $51_3$ by the coefficient a by a multiplication circuit $71_1$ and a signal obtained by multiplying the center channel signal entering the input terminal $51_3$ by the coefficient a by a multiplication circuit $71_1$. These signals are mixed by the addition circuit $72_2$ to form signals of the mixed right channel Rm. These mixed right channel Rm ape fed to the encoding circuit $52_5$ to form encoded signals which are sent to the codestring generating circuit 53.

The signals of the surround left channel, center channel and the surround right channel, entering the input terminals $51_2$ to $51_4$, respectively, are encoded by associated encoding circuits $52_2$ to $52_4$, and thence supplied to the codestring generating circuit 53.

The codestring generating circuit 53 generates the codestring of the pro-set format, from the signals encoded by the encoding circuits $52_1$ to $52_5$, and outputs the signals of the codestring at the terminal 54.

FIG. 4 shows an arrangement of a decoder for decoding and reproducing only signals of two mixed channels, that is the mixed left channel and the mixed right channel, from the codestring containing signals of the channel obtained by pre-mixing by the arrangement of FIG. 3. In FIG. 4, the components having the same function as that of similar components shown in FIG. 2 are depicted by the same reference numerals.

In FIG. 4, only signals of the mixed left channel and the mixed right channel are taken out from the codestring signals entering the input terminal 61 so as to be sent to the associated decoding circuits $63_1$ and $63_2$. The signals decoded by the decoding circuit $63_1$ are outputted at the output terminal $64_1$ as signals of the mixed left channel Lm, while the signals decoded by the decoding circuit $63_2$ are outputted at the output terminal $64_2$ as signals of the mixed right channel Rm.

FIG. 5 shows an arrangement of a decoder for decoding the codestring signals comprised of the pre-mixed channels and dematrixing the codestring signals to the non-pre-mixed state. In FIG. 5, the components having the same function as that of similar components shown in FIG. 2 are depicted by the same reference numerals.

Referring to FIG. 5, the codestring signals entering the input terminal 61 are separated by the codestring separating circuit 62 into encoded signals of the mixed left channel, surround left channel, center channel, surround right channel and the mixed right channel. The encoded signals of the mixed left channel are decoded by the decoding circuit $63_1$, while the encoded signals of the surround left channel are decoded by the decoding circuit $63_2$. In a similar manner, the encoded signals of the center channel, right surround channel and the mixed right channel are decoded are decoded by the decoding circuits $63_3$, $63_4$ and $63_5$, respectively. The decoded signals of the surround left, center and right surround channels are outputted at associated output terminals $64_2$, $64_3$ and $64_4$, respectively. An addition circuit $82_1$ is arranged downstream of the decoding circuit $63_1$ configured for decoding the mixed left channel. This addition circuit $82_1$ is supplied with the signals of the mixed left channel, decoded by the decoding circuit $63_1$, as an addition signal. The addition circuit is also supplied with a signal obtained on multiplying the surround left channel signal decoded by the decoding circuit $63_2$ with the coefficient b, by the multiplication circuit $81_2$, as a subtraction signal, and with a signal obtained on multiplying the center channel signal decoded by the decoding circuit $63_3$ with the coefficient a by a multiplication circuit $81_1$, as a subtraction signal. Thus the addition circuit $82_1$ generates a signal obtained on subtracting the surround left channel signal and the center channel signal from the signal of the mixed left channel, that is the left channel signal. This left channel signal is outputted at the output terminal $64_1$.

On the other hand, an addition circuit $82_2$ is arranged downstream of the decoding circuit $63_5$ configured for decoding the mixed right channel. This addition circuit $82_2$ is supplied with the signals of the mixed right channel, decoded by the decoding circuit $63_5$, as an addition signal. In addition, the addition circuit is supplied with a signal obtained on multiplying the surround right channel signal decoded by the decoding circuit $63_4$ with the coefficient b by a multiplication circuit $81_3$, as a subtraction signal, and with a signal obtained on multiplying the center channel signal decoded by the decoding circuit $63_3$ by the coefficient a by the multiplication circuit $81_1$, as a subtraction signal. Thus the addition circuit $82_2$ generates a signal obtained on subtracting the surround right channel signal and the center channel signal from the signal from the mixed right channel, that is the right channel signal. This right channel signal is outputted at the output terminal $64_5$.

The above-described system represents a technique employed in the MPEG2 audio standard (ISO/IEC 13813-3) by the Moving Picture Image Coding Experts Group (MPEG) for encoding moving pictures for storage installed under the auspices of the International Organization for Standardization (ISO).

Meanwhile, signals reproduced on dematrixing tends to be increased in noise as compared to the original signals. This noise is provisionally termed the mixing noise.

It is assumed that the signal level of the left channel L in the equation (3) is significantly smaller than the signal level of other channels (a*C) or (b*SL). If the signal mixed with the other channels is encoded in accordance with the high efficiency encoding system and subsequently decoded and dematrixed, the quantization noise of the other channels becomes predominant such that the left channel signal obtained by the calculation of the equation (8) superimposed by the quantization noise of the other channels is issued as an output signal.

Examples of the increased noise are explained with reference to waveform signals of the respective channels shown in FIG. 6.

FIG. 6A shows examples of the signal waveforms of the channels L, R, C, SL and SR entering the input terminals $51_1$ to $51_5$ of FIG. 3. FIG. 6B shows signal waveforms of the respective channels shown in FIG. 6A which are pre-mixed by the configuration of FIG. 3 and are subsequently supplied to the encoding circuits $52_1$ to $52_5$. That is, Lm and Rm in FIG. 6B stand for the signal waveforms of the mixed left channel and the mixed right channel, respectively. The signal waveforms of the remaining three channels are the same as those shown in FIG. 6A. FIG. 6C shows examples of signal waveforms of the respective channels L, R, C, SL and SR obtained by sending the signals of the respective channels shown in FIG. 6B to the configuration of FIG. 5 for decoding by the associated decoding circuits $63_1$ to $63_5$ and for dematrixing in the manner as shown in FIG. 5, that is examples of the signal waveforms outputted by the output terminals $64_1$ to $64_5$.

Comparison of the signal waveforms of the respective channels of FIG. 6A to those of FIG. 6C reveals that the decoded and dematrixed signals of the left channel L and the right channel R of FIG. 6C contain signal components not present in the encoded signal of the respective channels shown in FIG. 6A. This noise is the mixed noise generated by dematrixing as a result of superimposition of the quantization noises of the other channels.

Such phenomenon of noise generation is known to occur most significantly with signals of the channels having a small signal level.

For overcoming such inconvenience, it has been contemplated to selectively switch the respective channels of small signal levels for independent coding.

There is also known a system which is known as a simulcasting system in which the number of channels is increased and which consists in encoding signals of all the independent channels and signals of mixed channels.

FIG. 7 shows an encoder consisting in encoding signals in accordance with the simulcast system. In FIG. 7, the components having the function similar to that shown in FIGS. 1 or 3 are indicated by the same reference numerals.

Referring to FIG. 7, the left channel signals supplied to the input terminal $51_1$ are sent to the encoding circuit $52_2$ and to the addition circuit $72_1$. The signals encoded by the encoding circuit $52_2$ are sent to the codestring generating circuit 53.

On the other hand, the addition circuit $72_1$ is fed with the left channel signal from the input terminal $51_1$. The addition circuit $72_1$ is also fed with a signal obtained by multiplying the surround left channel entering the input terminal $51_2$ with the coefficient b by the multiplication circuit $71_2$ and with a signal obtained by multiplying the center channel entering the input terminal $51_3$ with the coefficient a by the multiplication circuit $71_1$. These signals are mixed together by the addition circuit $72_1$ so as to form signals of the mixed left channel Lm. These mixed left channel signals are sent to and encoded by the encoding circuit $52_1$ so as to be sent to the codestring generating circuit.

The right channel signals supplied to the input terminal are sent to an encoding circuit $52_6$ and to the addition circuit $72_2$. The signals encoded by the encoding circuit $52_2$ are sent to the codestring generating circuit 53.

On the other hand, the addition circuit $72_2$ is fed with the right channel signals from the input terminal $51_5$. The addition circuit $72_2$ is also fed with a signal obtained by multiplying the surround right channel signal entering the input terminal $51_4$ with the coefficient b by the multiplication circuit $71_3$ and with a signal obtained by multiplying the center channel entering the input terminal $51_3$ with the coefficient a by the multiplication circuit $71_1$. These signals are mixed together by the addition circuit $72_2$ so as to form signals of the mixed right channel Rm. These mixed right channel signals are sent to and encoded by a encoding circuit $52_7$ so as to be sent to the codestring generating circuit 53.

The surround left channel signals and the surround right channels, entering the input terminals $51_2$ to $51_4$, are encoded by associated encoding circuits $52_3$ to $52_5$ before being sent to the codestring generating circuit 53.

The codestring generating circuit 53 generates the above-mentioned codestring of the pre-set format from the signals encoded by the above-mentioned encoding circuits $52_1$ to $52_7$. This codestring is outputted at the terminal 54.

Thus, with the encoder shown in FIG. 7, the mixed left and mixed right channel signals are encoded along with signals of the other independent channels.

The simplified decoder for decoding only signals of the two mixed channels, associated with the encoder shown in FIG. 7, is of the same configuration as that shown in FIG. 4 and hence is not explained for simplicity.

The decoder for decoding the encoded signals of the simulcast system is the same as that shown in FIG. 3 and hence is not explained specifically for simplicity. That is, with the configuration shown in FIG. 3, even if the codestring signal obtained by the configuration of FIG. 7 is supplied at the input terminal 61, the mixed left and mixed right signals are not decoded.

The above-described technique of switching the contents of the independent encoding channels as means for reducing the mixing noise produced on dematrixing the signal of the mixed channels is effective if the signals to be mixed together are of a low signal level. However, if the signal is higher in level and has no correlation with other channels, the mixed noise tends to be heard. On the other hand, for implementing this technique, the operation of detecting the signal level or of switching the channels becomes complex and the circuit scale is increased, while a switching control signal specifying which channel has been selected needs to be transmitted to the decoder.

If, as means for decreasing the mixed noise generated on dematrixing the mixed channel signals, the technique of increasing the number of channels and encoding the independent channels and the mixed channels, the problem of deteriorated sound quality is raised due to shortage of the number of bits caused by increase in the number of channels. Since the number of bits needs to be increased for prohibiting the sound quality from being lowered, the above-mentioned technique is inappropriate for a recording medium having a limited volume of the recordable information.

SUMMARY OF THE INVENTION

It is therefore an object of the present invention to provide an information encoding method and apparatus, an information decoding method and apparatus and a recording medium whereby the mixed noise generated on dematrixing the mixed channel signals may be decreased effectively.

With the information encoding method and apparatus according to the present invention, independently encoded signals of independent channels and signals of non-independent channels not encoded independently are mixed together to generate signals of mixed channels, which are encoded. These encode signals are then decoded and signals of independent channels are generated from the decoded signals. Difference signals between these generated signals of the independent channels and pre-mixing signals of non-independent channels are encoded and codestring signals are subsequently generated from the encoded signals of the independent channels, encoded signals of the mixed channels and the encoded difference signals.

With the information decoding method and apparatus according to the present invention, the encoded signals of the independent channels, encoded signals of the mixed channels and the encoded difference signals are separated from the codestring signals obtained by the information encoding method and apparatus for decoding. The signals of the non-independent channels are generated from the decoded signals of the independent channels and the decoded signals of the mixed channels. The generated signals of the non-independent channels are added to the decoded difference signals.

The recording medium according to the present invention has recorded thereon the codestring signals generated by the information encoding method and apparatus of the present invention.

That is, according to the present invention, signals of the channel made up of difference signals between the pre-mixing signals of the non-independent channels and the signals of the non-independent channels as found by dematrixing signals of mixed channels are provided in addition to the signals of non-independent channels and the signals of the mixed channels. These signals are encoded at the time of encoding for generating codestring signals. The difference signals are added during decoding to the signals of the non-independent channels as found on dematrixing the signals of the mixed channels for preventing deterioration otherwise caused by noise mixing. Since the difference signals are derived from quantization noise components of the mixed channel signals, a smaller number of bits required for encoding suffices than when directly encoding the signals of the independent channels.

If the difference signals are not decoded on the decoder side, the decoder is of the same construction as the conventional decoder performing dematrixing, so that interchangeability with the conventional decoder is maintained. Furthermore, the disclosed technique has a feature that it can be employed in conjunction with the technique of switching the contents of the encoded channels as shown in the conventional system described above.

Thus, in accordance with the present invention, when encoding multi-channel audio or speech signals inclusive of signals of the mixed channels, whereby the audio or speech signals become reproducible even with the simplified decoder described above, the noise generated on dematrixing the signals of the mixed channels are included in the codestring signals as the difference signals between the pre-mixing signals of the non-independent channels and the signals of the non-independent channels as found by dematrixing signals of mixed channels, thus preventing the number of bits from being increased due to increase in the number of channels. In addition, it becomes possible to prevent noise from being produced due to pre-mixing and dematrixing thus realizing a higher encoding efficiency than with the conventional method.

BRIEF DESCRIPTION OF THE DRAWINGS

FIG. 12, consisting of FIGS. 12A to 12C, is a waveform diagram for illustrating the effect of an illustrative embodiment of the present invention.

DESCRIPTION OF THE PREFERRED EMBODIMENTS

Figure 1:
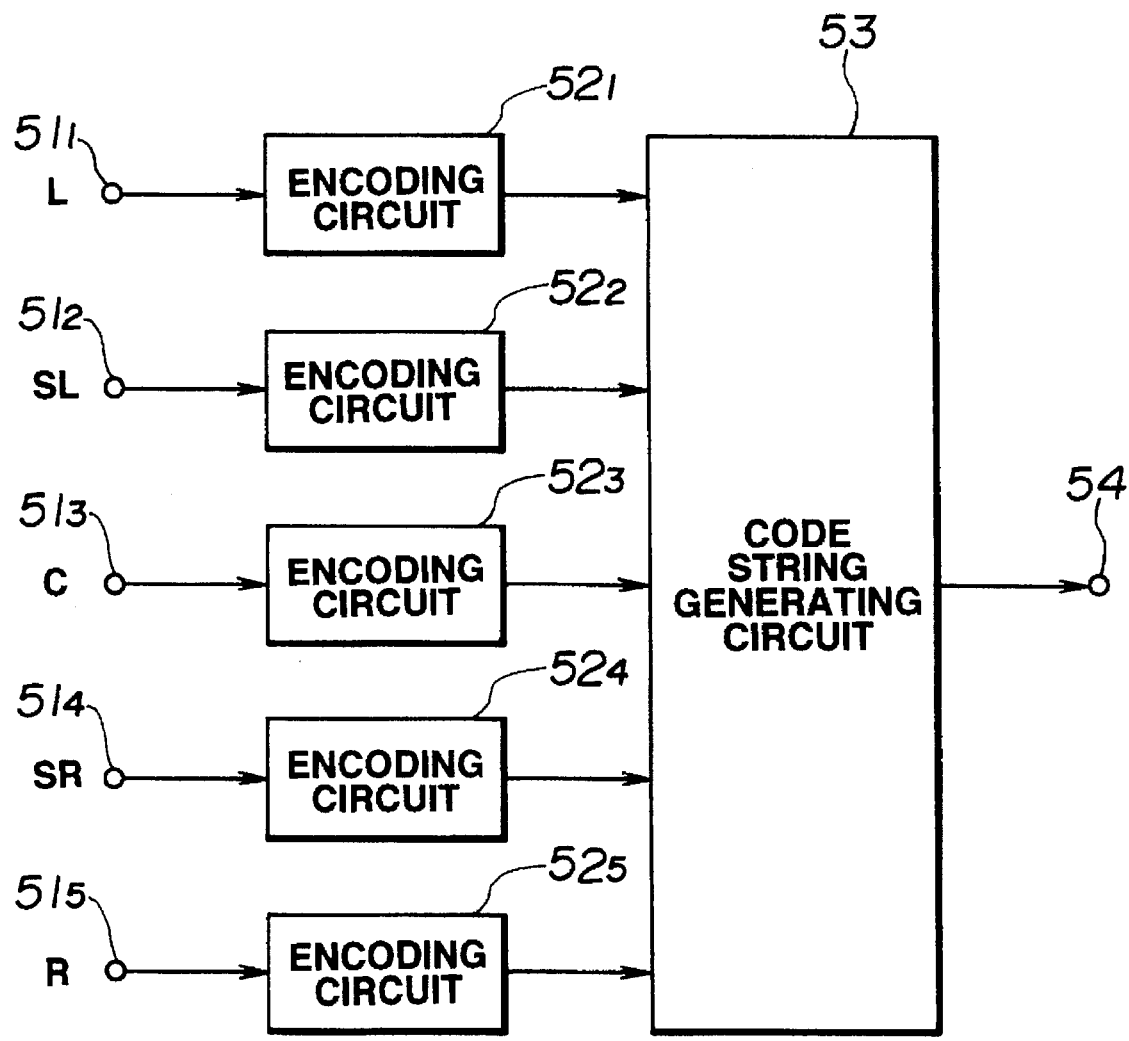
FIG. 1 is a schematic block circuit diagram showing an arrangement of a conventional encoder for directly encoding signals of plural channels.
Figure 2:
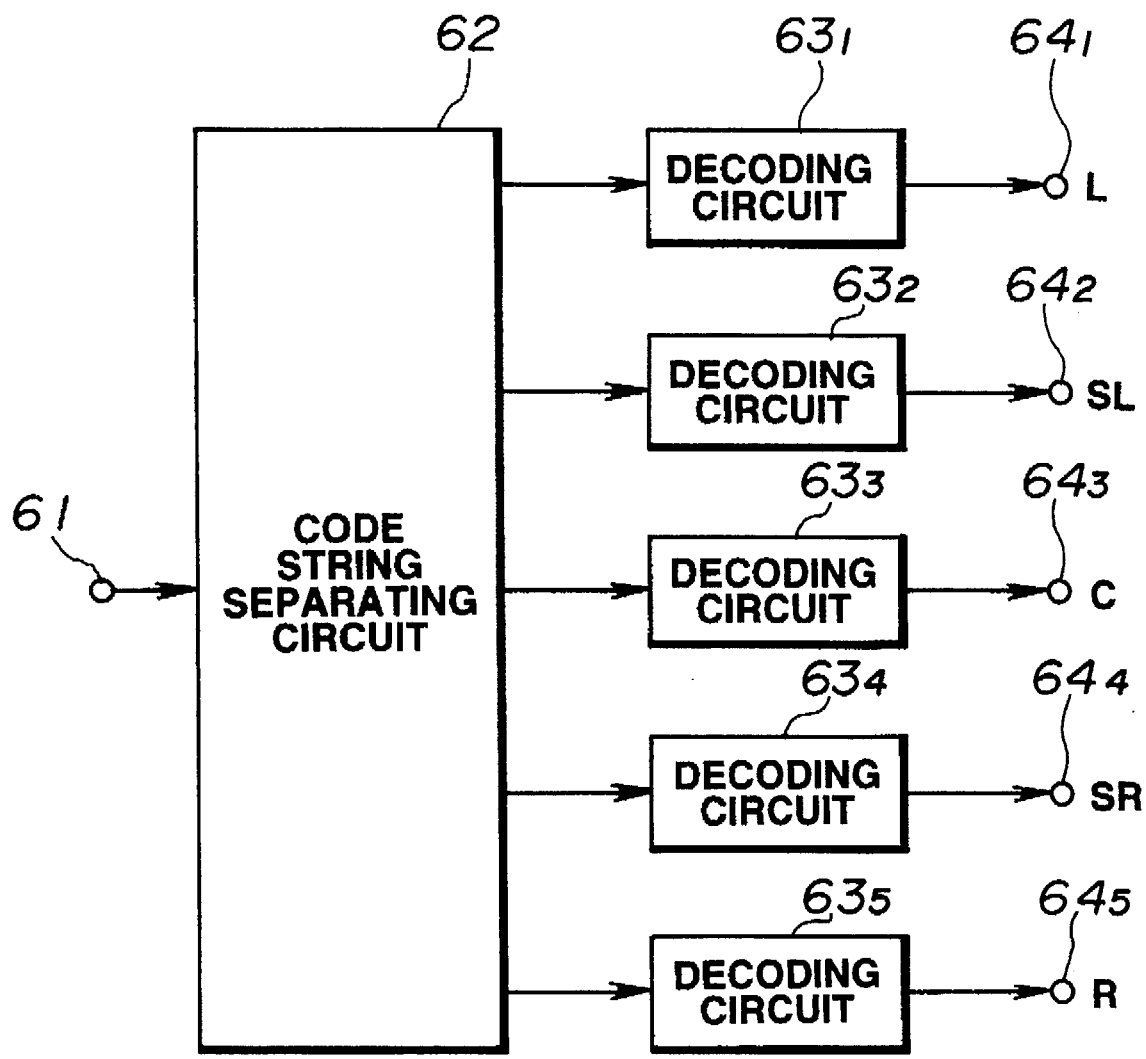
FIG. 2 is a schematic block circuit diagram showing an arrangement of a conventional decoder for decoding signals of plural channels from a codestring signal obtained on directly decoding signals of the plural channels.
Figure 3:
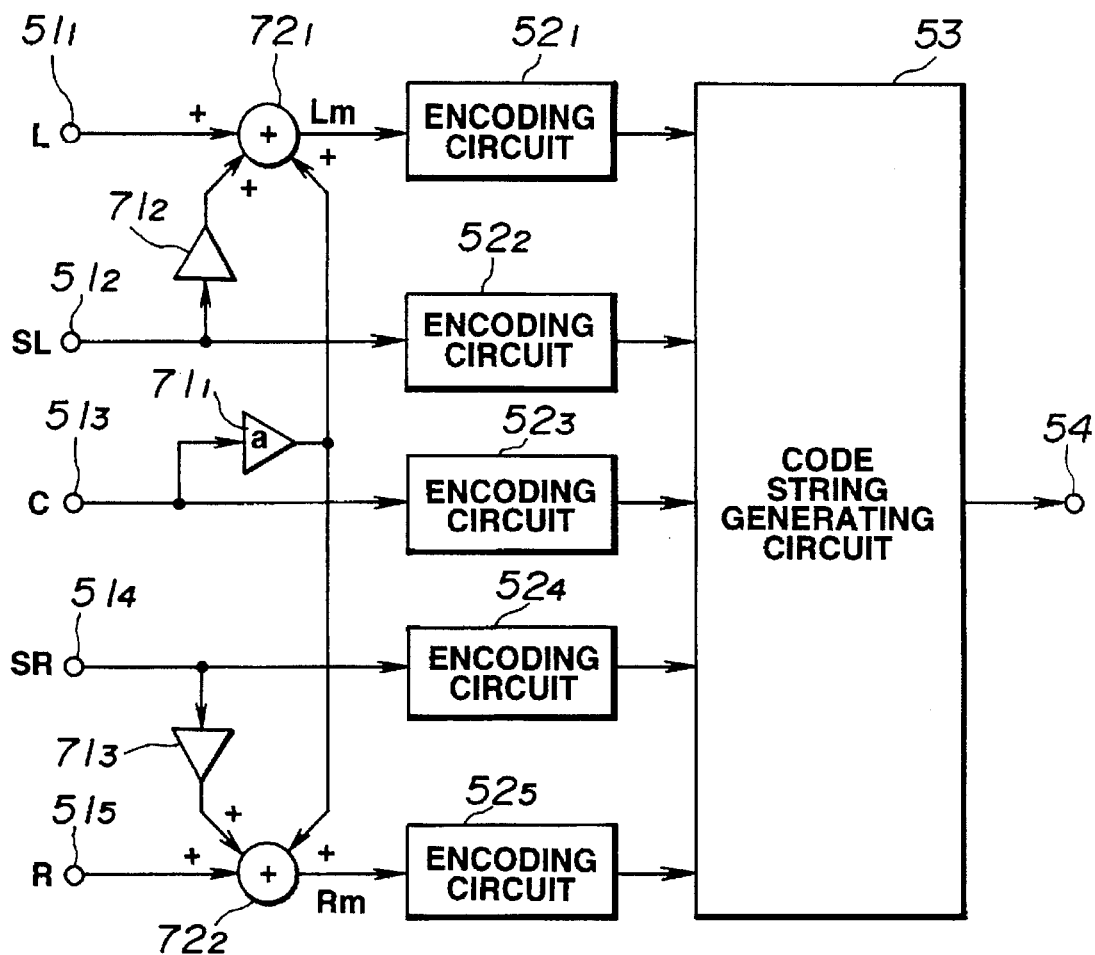
FIG. 3 is a schematic block circuit diagram showing an arrangement of a conventional encoder employing pre-mixing.

Referring to the drawings, preferred embodiments of the present invention will be explained in detail.

Figure 8:
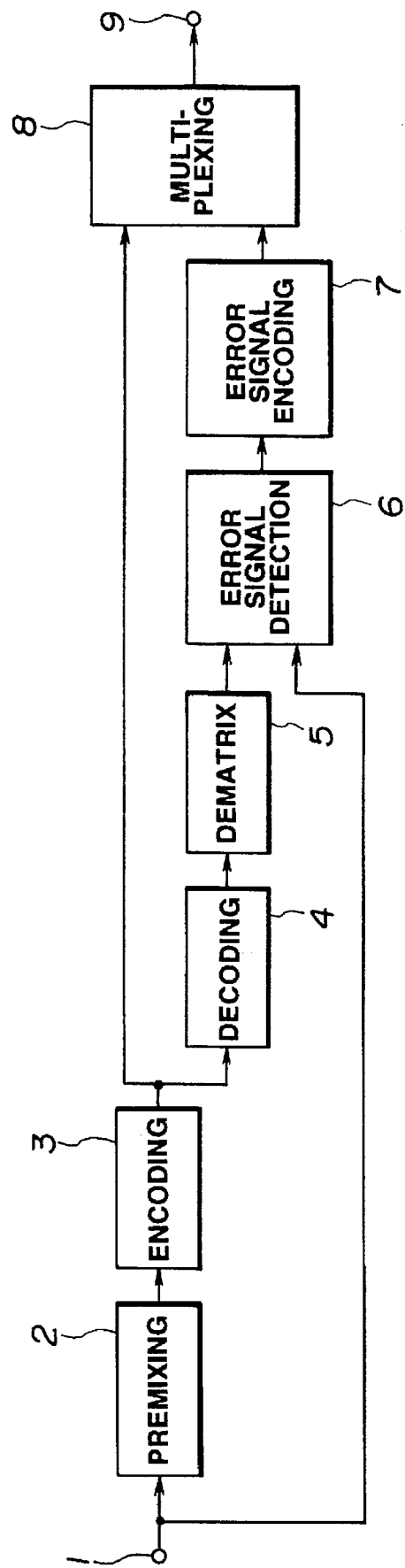
FIG. 8 is a block circuit diagram showing a basic construction of an information encoding apparatus for carrying out the information encoding method of the present invention.

Referring first to FIG. 8, the basic arrangement of an encoding apparatus (encoder) according to the present invention will be briefly explained.

In FIG. 8, signals comprised of signals of plural channels are supplied as input signals to an input terminal 1. These input signals are sent to a pre-mixer 2 and an error signal detection unit 6.

The pre-mixer 2 generates mixed channel signals from the multi-channel signals entering the input terminal 1 and transmits the mixed channel signals to the encoding unit 3 along with signals of the remaining independently encoded channels.

The encoding unit 3 encodes the multi-channel signals, inclusive of the mixed channel signals supplied from the encoding unit 2, and sends the encoded signals to a multiplexor 8 and to a decoding unit 4.

The decoding unit 4 decodes the multi-channel signals, inclusive of the mixed channel signals supplied from the encoding unit 3, and sends the decoded signals to a dematrixing unit 5.

The dematrixing unit 5 dematrixes the decoded multi-channel signals, inclusive of the mixed channel signals supplied from the decoding unit 4, for generating dematrixed multi-channel signals. The dematrixed multi-channel signals are sent to the error signal detection unit 6.

The error signal detection unit 6 detects error signals, as difference signals, from the dematrixed multi-channel signals supplied from the dematrixing unit 5 and the multi-channel signals supplied from the input terminal 1, and sends the error signals as channel error signals to an error signal encoding unit 7.

The error signal encoding unit 7 encodes the channel error signals from the error signal detection unit 6 and sends an encoded signal of the channel error signals resulting from the encoding to the multiplexor 8.

The multiplexor 8 multiplexes the encoded signals from the encoding unit 3 and the encoded signals from the error signal encoding unit 7 for forming a codestring signal of a pre-set format and outputs the codestring signals at an output terminal 9.

Figure 9:
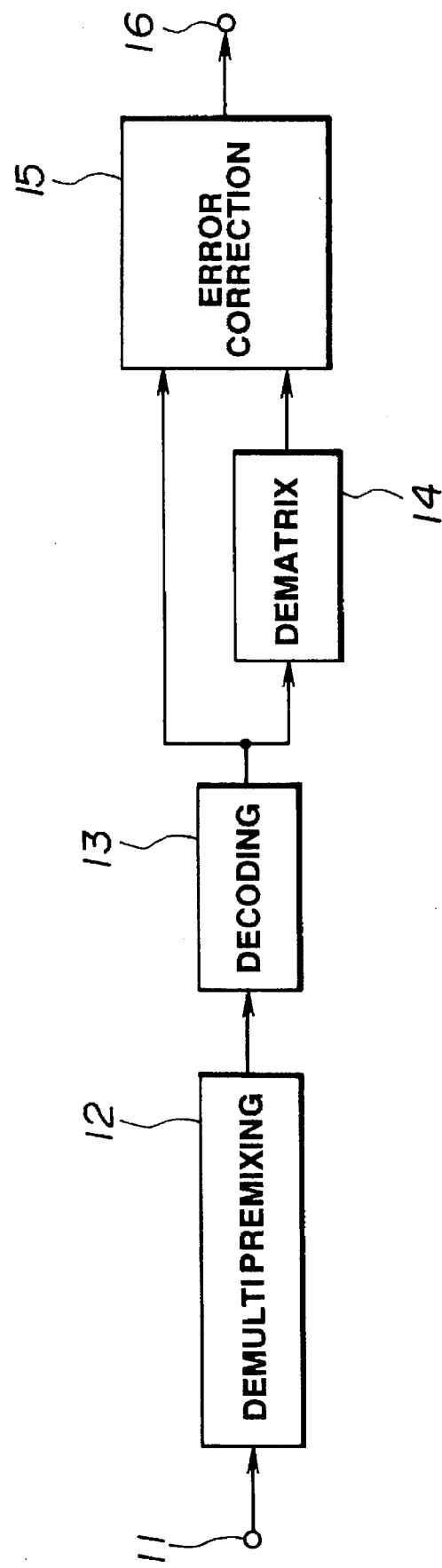
FIG. 9 is a block circuit diagram showing a basic construction of an information decoding apparatus for carrying out the information decoding method of the present invention.

Referring to FIG. 9, the basic arrangement of a decoding apparatus (decoder) for carrying out the decoding method of the present invention is briefly explained.

In FIG. 9, the multi-channel codestring signals, inclusive of the encoded and multiplexed mixed-channel signals from the encoder of FIG. 1 and channel error signals are supplied to the input terminal 11.

The codestring signals, entering the input terminal 1, are sent to a demultiplexor 12. The demultiplexor 12 demultiplexes the multi-channel codestring signals containing the multiplexed mixed channel signals and the channel error signals and sends the encoded signals of the respective channels to a decoding unit 13.

The decoding unit 13 decodes the encoded signals of the respective channels. Of the signals produced on decoding, the channel error signals are sent to an error correction unit 15, while the multi-channel signals, inclusive of the mixed channel signals, are sent to a dematrixing unit 14.

The dematrixing unit 14 dematrixes the multi-channel signals, inclusive of the decoded mixed channel signals, and sends the dematrixed multi-channel signals to the error correction unit 15.

The error correcting unit 15 corrects the dematrixed channel signals from the dematrixing unit 14 based upon the channel error signals from the decoding unit 13. The multi-channel signals, thus corrected for errors, are outputted at an output terminal 16.

Figure 10:
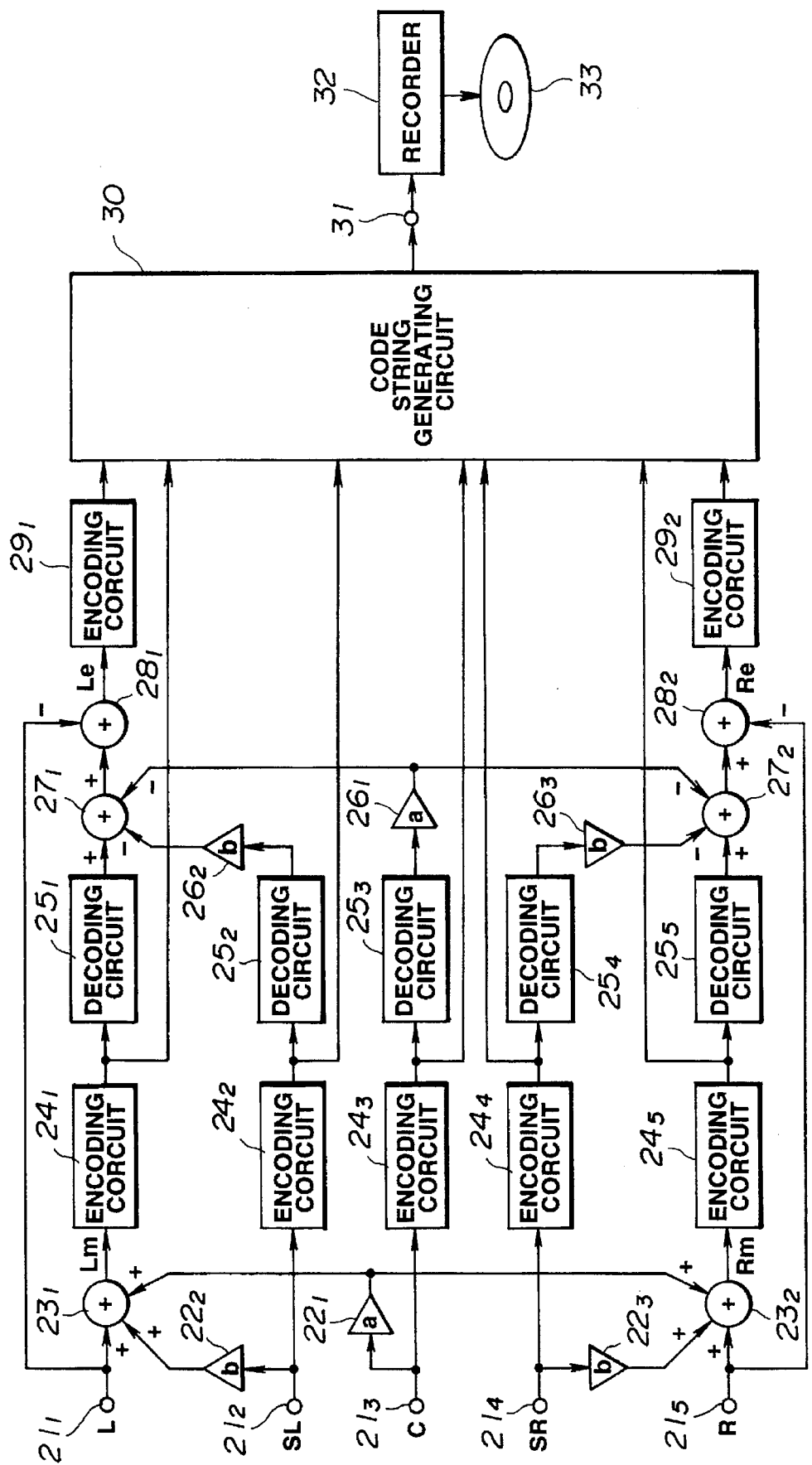
FIG. 10 is a block circuit diagram showing an illustrative arrangement of the information encoding apparatus according to the present invention.
Figure 11:
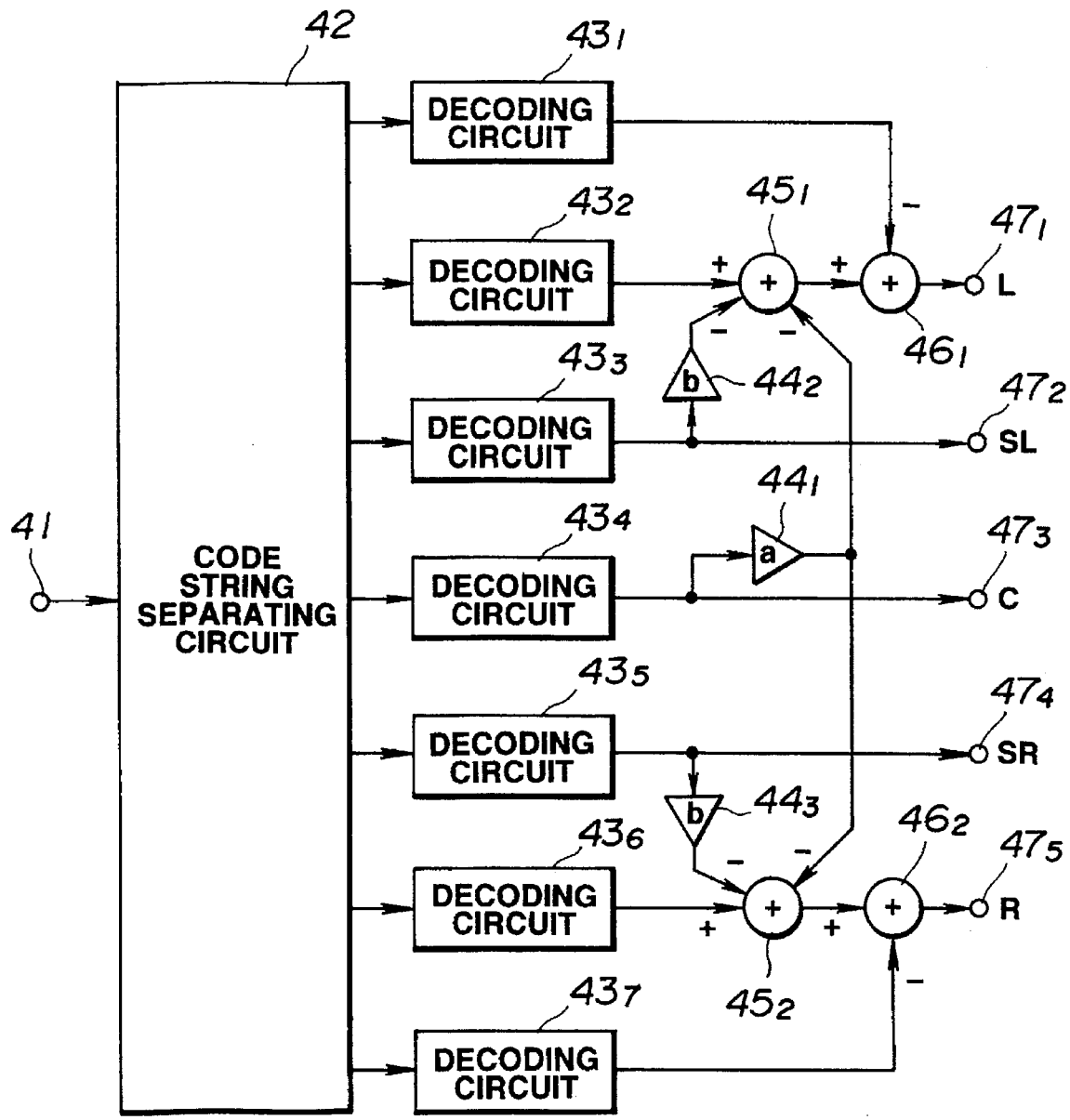
FIG. 11 is a block circuit diagram showing an illustrative arrangement of an information decoding apparatus according to the present invention.

Referring to FIGS. 10 and 11, the basic arrangement of the illustrative encoder and decoder in case of applying the basic construction of FIGS. 8 and 9 to signals of five channels, namely the above-mentioned left channel, surround left channel, center channel, surround right channel and the right channel, is now explained.

FIG. 10 shows an illustrative arrangement of an encoder fop encoding signals of the five channels.

Referring to FIG. 10, audio signals of the left channel L are supplied to an input terminal $21_1$, while audio signals of the surround left channel SL, center channel C, surround right channel SR and the right channel R are supplied to input terminals $21_1$, $21_2$, $21_3$, $21_4$, respectively. These input terminals $21_1$ to $21_5$ correspond to the input terminal 21 of FIG. 1.

The left channel signals supplied to the input terminal $21_1$ are sent to an addition circuit $23_1$ and to an addition circuit $28_1$, as later explained, as an addition signal and as a subtraction signal, respectively. The addition circuit $23_1$ is also fed with a signal obtained by multiplying the surround left channel signals entering the input terminal $21_2$ with the coefficient b by a multiplication circuit $22_2$ and with a signal obtained by multiplying the center channel signals entering the input terminal $21_3$ with the coefficient a by a multiplication circuit $22_1$. These signals are mixed in the addition circuit $23_1$ for forming the mixed left channel signals Lm.

The right channel signals supplied to the input terminal $21_5$ are sent to an addition circuit $23_2$ and to an addition circuit $28_2$, as later explained, as an addition signal and as a subtraction signal, respectively. The addition circuit $23_2$ is also fed with a signal obtained by multiplying the surround right channel signals entering the input terminal $21_4$ with the coefficient b by a multiplication circuit $22_3$ and with a signal obtained by multiplying the center channel signals entering the input terminal $21_3$ with the coefficient a by the multiplication circuit $22_1$. These signals are mixed in the addition circuit $23_2$ for forming the mixed right channel signals Rm.

The signals of the mixed left channel Lm, thus formed, are sent to an encoding circuit $24_1$, while signals of the mixed right channel Rm are sent to an encoding circuit $24_5$. The signals of the surround left channel, center channel and the surround right channel are sent as independently coded signals of independent channels to associated encoding circuits $24_3$ to $24_5$, respectively. These encoding circuits $24_1$ to $24_5$ encode the respective supplied signals. Thus, with the arrangement of FIG. 10, the arrangement of forming the signals of the mixed channels correspond to the pre-mixer 2 of FIG. 8, while the encoding circuits $24_1$ to $24_5$ correspond to the encoding unit 3 of FIG. 1. In addition, the left and right channel signals constitute signals of independent channels which are not encoded independently.

The encoded signals of the encoding circuits $24_1$ to $24_5$ are sent to associated decoding circuits $25_1$ to $25_5$, respectively, while also being sent to a codestring generating circuit 30. The decoding circuits $25_1$ to $25_5$ correspond to the decoding unit 4 of FIG. 8, while the codestring generating circuit 30 corresponds to the multiplexor 8 of FIG. 8.

Of the signals decoded by the decoding circuits $25_1$ to $25_5$, the mixed left channel signals are sent as addition signals to an addition circuit $27_1$. The addition circuit $27_1$ is also fed with a signal obtained by multiplying the surround left channel signal decoded by the decoding circuit $25_2$ with the coefficient b by a multiplication circuit $26_2$, as a subtraction signal, and with a signal obtained by multiplying the center channel signal decoded by the decoding circuit $25_3$ with the coefficient a by a multiplication circuit $28_1$, as a subtraction signal. Thus the addition circuit $27_1$ forms a signal corresponding the mixed left channel signals less the surround left channel and center channel signals, that is the left channel signals containing the mixing noise. The left channel signals, containing the mixing noise, are sent as addition signals to an addition circuit $28_1$.

Of the signals decoded by the decoding circuits $25_1$ to $25_5$, the mixed right channel signals ape sent as addition signals to an addition circuit $27_2$. The addition circuit $27_2$ is also fed with a signal obtained by multiplying the supround right channel signal decoded by the decoding circuit $25_4$ with the coefficient b by the multiplication circuit $26_3$, as a subtraction signal, and with a signal obtained by multiplying the center channel signal decoded by the decoding circuit $25_3$ with the coefficient a by the multiplication circuit $26_1$, as a subtraction signal. Thus the addition circuit $27_2$ forms a signal corresponding to the mixed right channel signals less the surround right channel and center channel signals, that is the right channel signals containing the mixing noise. The right channel signals, containing the mixing noise, are sent as addition signals to an addition circuit $28_2$.

The arrangement for generating the left channel signals containing the mixing noise and for generating the right channel signals similarly containing the mixing noise corresponds to the dematrixing unit 5 shown in FIG. 8.

On the other hand, the addition circuits $28_1$ and $28_2$ correspond to the error signal detection unit 6 shown in FIG. 8. The addition circuit $28_1$ finds the difference between the pre-mixing left channel signals from the input terminal $21_1$ and the left channel signals from the addition circuit $27_1$ containing the mixing noise, while the addition circuit $28_2$ finds the difference between the pre-mixing right channel signals from the input terminal $21_5$ and the right channel signals from the addition circuit $27_2$ containing the mixing noise. The difference signals from the addition circuits $28_1$ and $28_2$ are sent as respective error signals Le and Re to associated encoding circuits $29_1$ and $29_2$, respectively.

These encoding circuits $29_1$ and $29_2$, corresponding to the error signal encoding circuit 7 of FIG. 8, encode the supplied channel error signals and send the encoded error signals to the codestring generating circuit 30.

The codestring generating circuit 30, corresponding to the multiplexor 8 of FIG. 8, assembles signals of respective channels, encoded by the encoding circuits $24_1$ to $24_5$, and the channel error signals encoded by the encoding circuits $29_1$ and $29_2$, into a codestring for transmission or recording on a recording medium in accordance with a pre-set format, and outputs the codestring signals via a terminal 31.

The codestring signals, outputted at the terminal 31, are recorded or transmitted over a transmission route. For recording, the codestring signals are transmitted to a recording device 32. The recording device 32 includes an error correction code appending circuit, a modulation circuit etc., and records the codestring signals processed by the error correction code appending circuit or the modulation circuit, on a recording medium typified by an optical disc 33. If the recording medium is a read-only ROM disc, such as a compact disc, it is fabricated as a master disc, whereas, if the recording medium is an overwritable RAM disc, codestrings are directly recorded on the disc.

Figure 4:
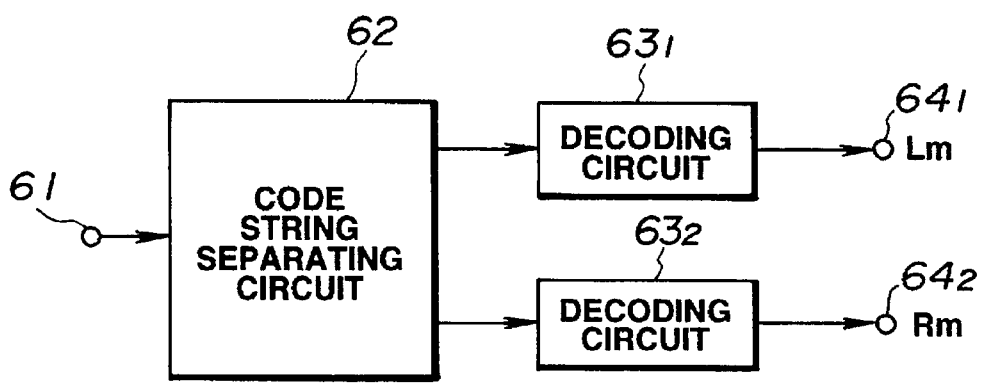
FIG. 4 is a schematic block circuit diagram showing an arrangement of a simplified decoder reproducing only 2-channel signals from the pre-mixed codestring signals.
Figure 5:
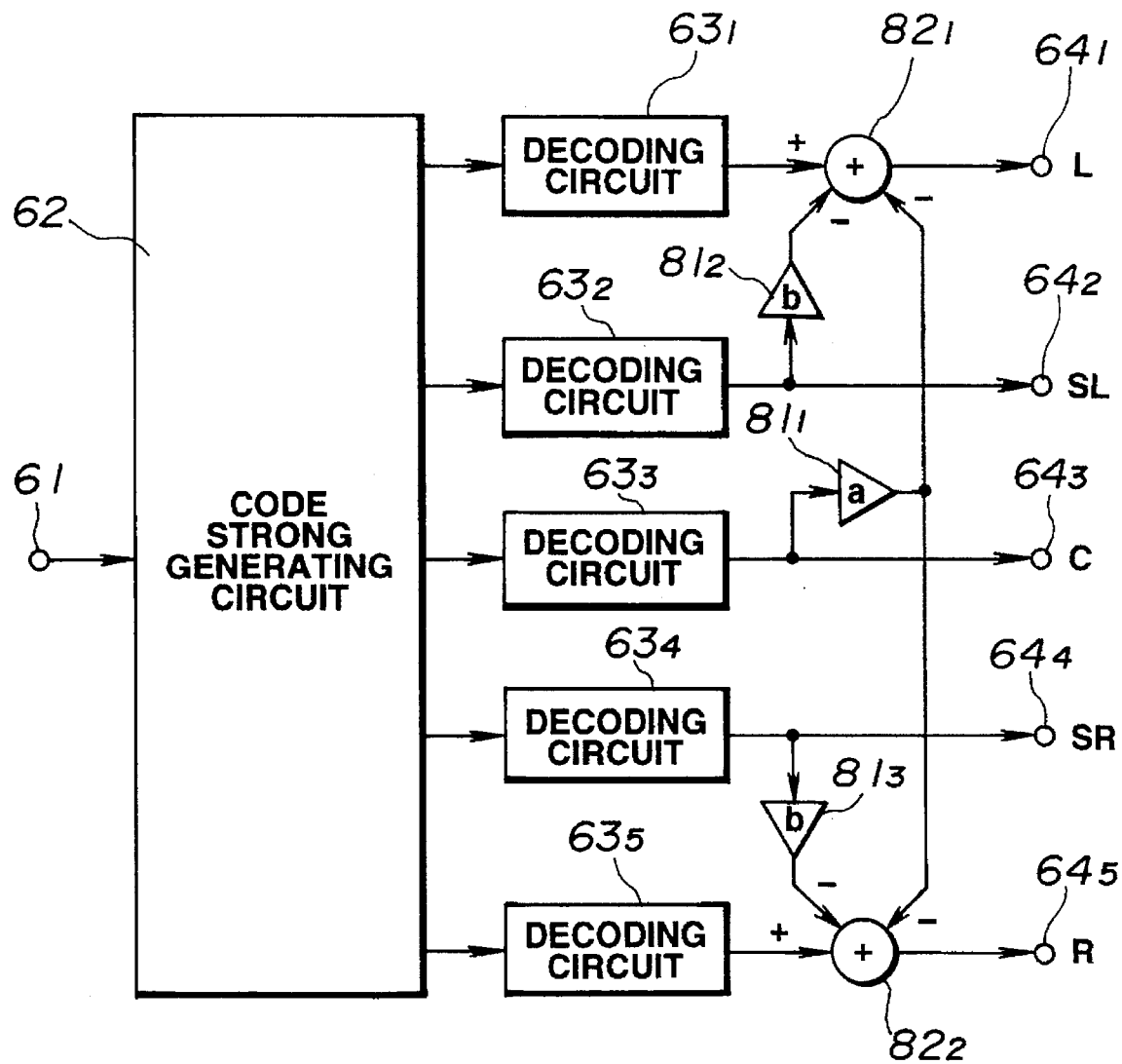
FIG. 5 is a block circuit diagram showing an arrangement of a conventional decoder configured for dematrixing the pre-mixed codestring signals.

The simplified decoder configured for reproducing only the two pre-mixed channel signals from the encoded multi-channel signals is configured similarly to the device shown in FIG. 4 and hence is not explained for simplicity.

As an illustrative arrangement of the decoder of the present invention, shown in FIG. 9, a decoder for dematrixing the encoded multi-channel signals to the non-pre-mixed state is configured as shown in FIG. 11.

In this figure, the codestring signals reproduced or transmitted from the recording medium over a transmission path are fed via an input terminal 41 to a codestring separating circuit 42, which then separates the supplied codestring signals into channel-based encoded signals in accordance with a pre-set format. The codestring separating circuit 42 corresponds to the demultiplexor 12 of FIG. 8.

The channel-based encoded signals, separated by the codestring separating circuit 42, are sent to channel-based decoding circuits $43_1$ to $43_7$ for decoding. For example, the encoded signals of the channel error signals Le from the left channel, containing the above-mentioned mixing noise, are decoded by the decoding circuit $43_1$, while the encoded signals from the left channel are decoded by the decoding circuit $43_2$. In a similar manner, the encoded signals from the surround left channel, the encoded signals from the center channel, the encoded signals from the surround right channel, the encoded signals from the right channel, the encoded signals from the right channel and the encoded signals of the channel error signals Re generated from the right channel containing the mixing noise, are decoded by the decoding circuits $43_3$, $43_4$, $43_5$, $43_6$ and $43_7$, respectively. These decoding circuits $43_1$ to $43_7$ correspond to the decoding unit 13 shown in FIG. 8.

Of the signals decoded by the decoding circuits $43_1$ to $43_7$, the mixed left channel signals from the decoding circuit $43_2$ are sent as addition signals to an addition circuit $45_1$. The addition circuit $45_1$ is also fed with a signal obtained by multiplying the surround left channel signal decoded by the decoding circuit $43_3$ with the coefficient b by a multiplication circuit $44_2$, as a subtraction signal, and with a signal obtained by multiplying the center channel signal decoded by the decoding circuit $43_4$ with the coefficient a by the multiplication circuit $44_1$, as a subtraction signal. Thus the addition circuit $45_1$ forms a signal corresponding to the mixed left channel signals less the surround left channel and center channel signals, that is the left channel signals containing the mixing noise. The left channel signals, containing the mixing noise, are sent as addition signals to an addition circuit $46_1$.

Of the signals decoded by the decoding circuits $43_1$ to $43_7$, the mixed right channel signals from the decoding circuit $43_6$ are sent as addition signals to an addition circuit $45_2$. The addition circuit $45_2$ is also fed with a signal obtained by multiplying the surround right channel signal decoded by the decoding circuit $43_5$ with the coefficient b by a multiplication circuit $44_3$, as a subtraction signal, and with a signal obtained by multiplying the center channel signal decoded by the decoding circuit $43_4$ with the coefficient a by the multiplication circuit $44_1$, as a subtraction signal. Thus the addition circuit $45_2$ forms a signal corresponding to the mixed right channel signals less the surround right channel and center channel signals, that is the right channel signals containing the mixing noise. The right channel signals, containing the mixing noise, are sent as addition signals to an addition circuit $46_2$.

The configuration for forming the right channel signals containing mixing noise, similarly to the left channel signals containing the mixing noise, corresponds to the dematrixing unit 14 shown in FIG. 8.

The addition circuit $46_1$ effects an addition operation, with the left channel signal containing the mixing noise from the addition circuit $45_1$ as the addition signal and with the channel error signal Le from the left channel containing the mixing error signals from the decoding circuit $43_1$ as the subtraction signal, for correcting errors in the left channel signal containing the mixing noise. Output signals of the addition circuit $46_1$ are sent as error-corrected left channel signals to an output terminal $47_1$.

The addition circuit $46_2$ effects an addition operation, with the right channel signal containing the mixing noise from the addition circuit $45_2$ as the addition signal and with the channel error signal Re from the right channel containing the mixing error signals from the decoding circuit $43_7$ as the subtraction signal, for correcting errors in the right channel signal containing the mixing noise. Output signals of the addition circuit $46_2$ are sent as error-corrected right channel signals to an output terminal $47_5$.

The addition circuits $46_1$ and $46_2$ correspond to the error correction unit 15 shown in FIG. 8.

Of the signals decoded by the decoding circuits $43_1$ to $43_7$, the decoded signals for the channels independently encoded by the encoder of FIG. 10, herein the decoded signals of the center channel, surround left channel and the surround right channel, are outputted at associated output terminals $47_2$ to $47_4$, respectively.

It is seen from above that, while the prior-art device simply encodes signals of the respective channels, part of the encoded signals of the channels are decoded within the encoder with the present invention and difference signals, that is channel error signals, are obtained by pre-set processing operations. This partial decoding is termed local decoding. The channel error signals are produced using the signals obtained by local decoding. The decoder executes processing operations on the channel error signals and signals of the channel containing the mixing noise for ultimately forming signals of the respective channels.

Reference is had to FIG. 12 showing the waveforms of various portions in the configuration shown in FIGS. 11 and 12 for explaining the effects proper to the illustrative embodiment of the present invention.

Figure 6:
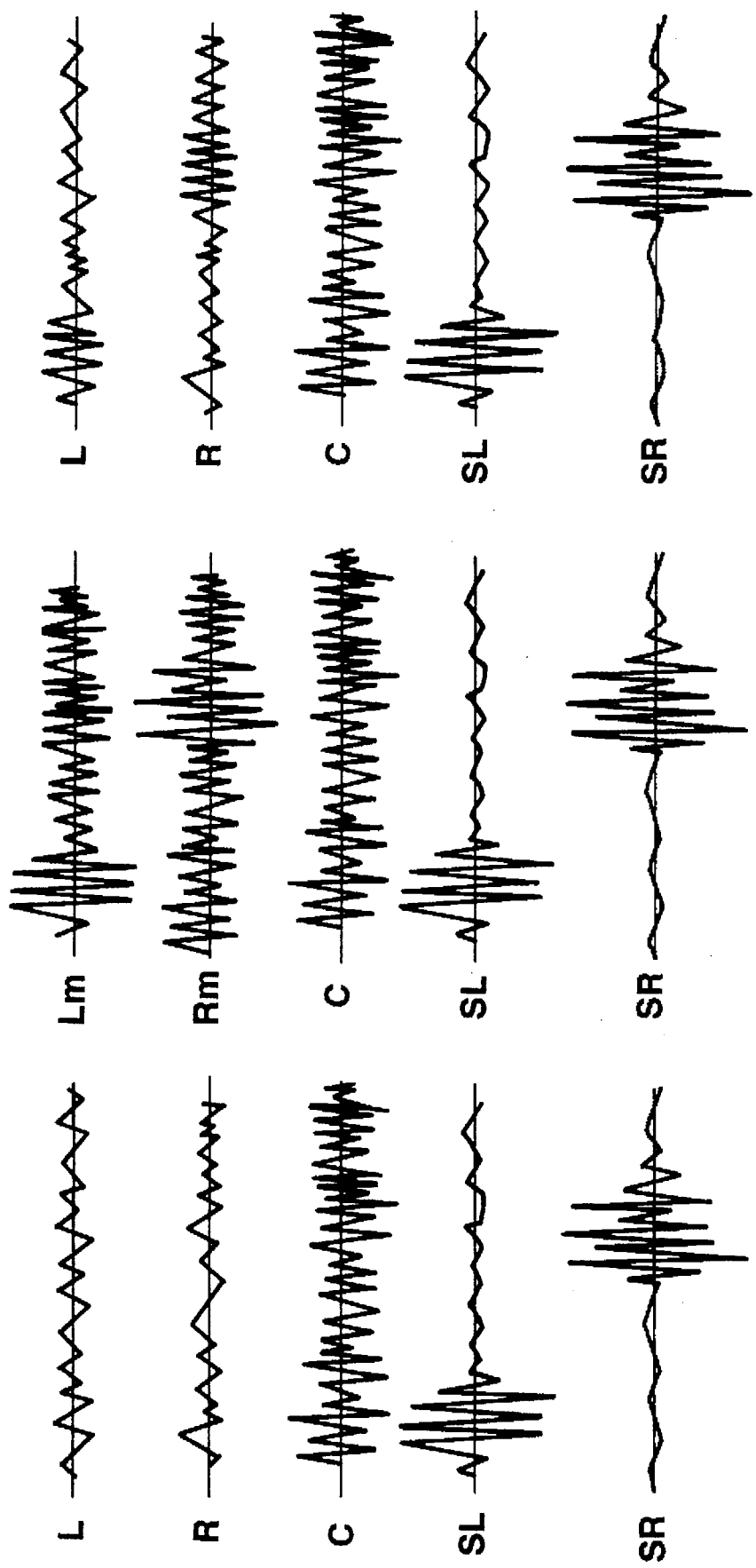
FIGS. 6A to 6C are waveform diagrams showing signal waveforms of various components of a conventional encoder and a conventional decoder configured for effecting pre-mixing and dematrixing, respectively.
Figure 7:
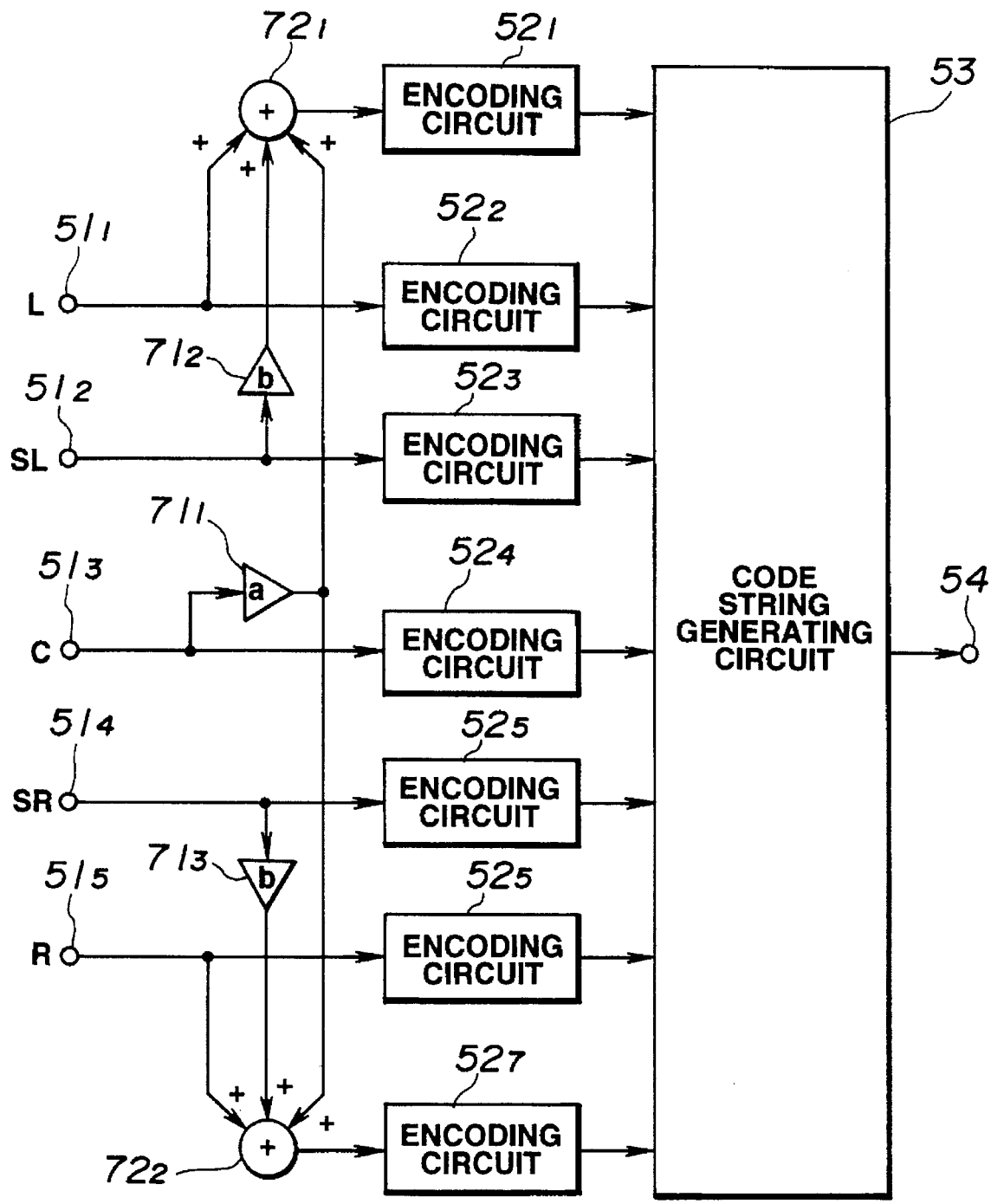
FIG. 7 is a block circuit diagram showing an arrangement of a conventional encoder configured for encoding pre-mixed channels and independent channels.

FIG. 12A shows examples of the signal waveforms of the respective channels L, R, C, SL and SR entering the input terminals $21_1$ to $21_5$ of FIG. 10. The signal waveforms of FIG. 12A are of the same waveforms as those shown in FIG. 6A for comparison with FIG. 6. FIG. 12B shows signal waveforms of the respective channels obtained on pre-mixing the signals of respective channels shown in FIG. 12A by the configuration shown in FIG. 10 and supplying the resulting pre-mixed signals to the encoding circuits $24_1$ to $24_5$, and signal waveforms of the channel error signals outputted by the addition circuits $28_1$ and $28_2$. That is, Lm and Rm in FIG. 12B stand for the signal waveforms of the mixed left channel and the mixed right channel, respectively, while the remaining three channels C, SL and SR are the same as those shown in FIG. 12A. In FIG. 12B, Le and Re stand for channel error signals outputted by the addition circuits $28_1$ and $28_2$, respectively. The signals of the respective channels, shown in FIG. 12B, correspond to signals on the recording medium and on the transmission route. FIG. 12C shows signal waveforms of the respective channels L, R, C, SL and SR obtained on sending the signals of the respective channels shown in FIG. 12B to the configuration shown in FIG. 11, decoding the respective signals by the decoding circuits $43_1$ to $43_7$ associated with the respective channels and processing the decoded signals by the dematrixing and error correcting configuration shown in FIG. 11, that is the signal waveforms outputted by the output terminals $47_1$ to $47_5$.

As apparent from comparison between the signal waveform of FIG. 12C and that of FIG. 6C, the mixing noise of the left and right channels is diminished with the above-described embodiments of the present invention.

Although the foregoing description has been made with reference to a multi-channel system employing five channels, the present invention is not limited to this specific number of channels For example, the present invention may be applied to a seven-channel system in which, in addition to the above given five channels, a left center channel is provided between the left channel and the center channel and a right center channel is provided between the right channel and the center channel. The present invention may be applied to a larger number of channels, or a smaller number of channels, such as three or four channels.

In addition, the signals formed by the encoding method or apparatus of the present invention may be recorded on a variety of recording media, such as films, tape-shaped recording media or semiconductor memories, in addition to the above-mentioned optical discs. Furthermore, the signals formed by the encoding method or apparatus of the present invention may be transmitted over a telephone network or transmission routes such as broadcast.

What is claimed is:

1. An information encoding method for encoding signals of a plurality of channels comprising:

a channel mixing step of mixing signals of independently coded independent channels and signals of non-independent channels not encoded independently for generating signals of mixed channels;

a channel signal encoding step of encoding the signals of the mixed channels and the signals of the independent channels;

a channel signal decoding step of decoding the encoded signals of the mixed channels and the encoded signals of the independent channels;

a channel signal generating step of generating signals of non-independent channels from the decoded signals of the mixed channels and the decoded signals of the independent channels;

a channel signal generating step of generating signals of the non-independent channels from the decoded signals of the mixed channels and the decoded signals of the non-independent channels;

a difference signal generating step of generating difference signals between the signals of the non-independent channels generated by the channel signal generating step and the signals of the non-independent channels prior to mixing; a difference signal encoding step of encoding said difference signal; and a codestring generating step of generating a codestring signal from the encoded signals of the independent channels, the encoded signals of the mixed channels and the encoded difference signals.

2. The information encoding method as claimed in claim 1 wherein, during the channel mixing step, the signals of the non-independent channels are summed to signals obtained on multiplying the signals of the independent channels to generate the signals of the mixed channels.

3. The information encoding method as claimed in claim 1 wherein, during the channel signal generating step, signals obtained on multiplying the signals of the decoded independent channels with a pre-set coefficient are subtracted from the decoded signals of the mixed channels for generating signal of the non-independent channels.

4. An information encoding apparatus for encoding signals of a plurality of channels comprising:

channel mixing means for mixing signals of independently coded independent channels and signals of non-independent channels not encoded independently for generating signals of mixed channels;

channel signal encoding means for encoding the signals of the mixed channels and the signals of the independent channels;

channel signal decoding means for decoding the encoded signals of the mixed channels and the encoded signals of the independent channels;

channel signal generating means for generating signals of non-independent channels from the decoded signals of the mixed channels and the decoded signals of the independent channels;

channel signal generating means for generating signals of the non-independent channels from the decoded signals of the mixed channels and the decoded signals of the non-independent channels;

difference signal generating means for generating difference signals between the signals of the non-independent channels generated by the channel signal generating step and the signals of the non-independent channels prior to mixing;

difference signal encoding means for encoding said difference signal; and codestring generating means for generating a codestring signal from the encoded signals of the independent channels, the encoded signals of the mixed channels and the encoded difference signals.

5. The information encoding apparatus as claimed in claim 4 wherein, during the channel mixing step, the signals of the non-independent channels are summed to signals obtained on multiplying the signals of the independent channels to generate the signals of the mixed channels.

6. The information encoding apparatus as claimed in claim 4 wherein, during the channel signal generating step, signals obtained on multiplying the signals of the decoded independent channels with a pre-set coefficient are subtracted from the decoded signals of the mixed channels for generating signal of the non-independent channels.

7. An information decoding method for decoding signals of plural channels from encoded codestring signals obtained on encoding signals of a plurality of channels comprising:

a separating step of separating, from said codestring signals, independently encoded signals of independent channels, encoded signals of mixed channels obtained on mixing signals of non-independent channels not encoded independently and the signals of the independent channels, and encoded difference signals representing the difference between the signals of the independent channels prior to mixing and the signals of non-independent channels generated from the encoded signals of the independent channels and encoded signals of the mixed channels;

a signal decoding step of decoding the encoded signals of the independent channels, the encoded signals of the mixed channels and the encoded difference signals;

a channel signal generating step of generating signals of non-independent channels from the decoded signals of the independent channels and the decoded signals of the mixed channels; and an addition step of adding the signals of the non-independent channels generated by the channel signal generating step and the decoded difference signals.

8. The information decoding method as claimed in claim 7 wherein, during the channel signal generating step, signals obtained on multiplying the decoded signals of the independent channels by a pre-set coefficient are subtracted from the decoded signals of the independent channels for generating the signals of the independent channels.

9. An information decoding apparatus for decoding signals of plural channels from encoded codestring signals obtained on encoding signals of a plurality of channels comprising:

separating means for separating, from said codestring signals, independently encoded signals of independent channels, encoded signals of mixed channels obtained on mixing signals of non-independent channels not encoded independently and the signals of the independent channels, and encoded difference signals representing the difference between the signals of the independent channels prior to mixing and the signals of non-independent channels generated from the encoded signals of the independent channels and encoded signals of the mixed channels;

signal decoding means for decoding the encoded signals of the independent channels, the encoded signals of the mixed channels and the encoded difference signals;

channel signal generating means for generating signals of non-independent channels from the decoded signals of the independent channels and the decoded signals of the mixed channels; and addition means for adding the signals of the non-independent channels generated by the channel signal generating step and the decoded difference signals.

10. The information decoding apparatus as claimed in claim 7 wherein, during the channel signal generating step, signals obtained on multiplying the decoded signals of the independent channels by a pre-set coefficient are subtracted from the decoded signals of the independent channels for generating the signals of the independent channels.

11. A recording medium having encoded signals of a plurality of channels recorded thereon, wherein the improvement resides in that the encoded signals recorded are codestring signals comprising:

encoded independently coded signals of independent channels;

encoded signals of mixed channels obtained upon mixing and encoding signals of non-independent channels not encoded independently and the independently-coded signals of the independent channels; and encoded difference signals representing the difference between the signals of the independent channels prior to mixing and the signals of the non-independent signals generated from the encoded signals of the independent channels and encoded signals of the mixed channels;

said encoded signals of the independent channels, the encoded signals of the mixed channels and the encoded difference signals characterized as codestring signals.

* * * * *